United States Patent

[11] 3,610,909

[72] Inventor Jan Jeppsson
Bellevue, Wash.
[21] Appl. No. 23,633
[22] Filed Mar. 30, 1970
[45] Patented Oct. 5, 1971
[73] Assignee The Boeing Company
Seattle, Wash.

[54] DATA CONVERSION SYSTEM
9 Claims, 14 Drawing Figs.

[52] U.S. Cl. ..................................... 235/189,
328/21
[51] Int. Cl. ..................................... G06g 7/22
[50] Field of Search .......................... 332/148;
328/134, 151, 155, 21; 324/120; 235/154, 150.53,
186, 189; 340/347

[56] References Cited

UNITED STATES PATENTS

| | | | |
|---|---|---|---|
| 3,384,738 | 5/1968 | Warrick, Jr. ............... | 235/189 |
| 3,478,198 | 11/1969 | Lewis et al. ............... | 235/150.53 X |
| 3,555,261 | 1/1971 | McClurg .................... | 235/186 X |

Primary Examiner—Maynard R. Wilbur
Assistant Examiner—Charles D. Miller
Attorneys—Glenn Orlob, Kenneth W. Thomas and Conrad O. Gardner ABSTRACT: An electronic system for converting an analog input signal into typical synchro or resolver-type signals. The input voltage is compared with function waveform such as a ramp voltage of a given frequency which is synchronized to the alternating current and power source. When the input voltage balances out the ramp voltage, a sampling pulse is generated. With this pulse, the instantaneous values of two-power frequency sine waves are measured and held in sample-and-hold circuits. The two-power frequency signals are phase-locked to the ramp voltage and can be derived from a biphase oscillator. Coupled to the sample-and-hold circuits are power frequency modulators and output amplifiers with active filters which provide a pair of synchro or resolver-type output signals. The ramp voltage generator and sine wave generator are commonly utilized in the case of a plurality of converter channels.

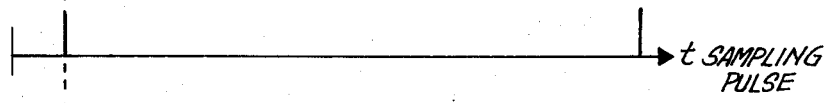
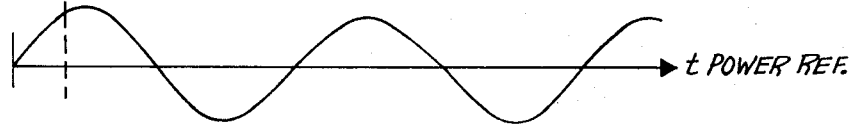
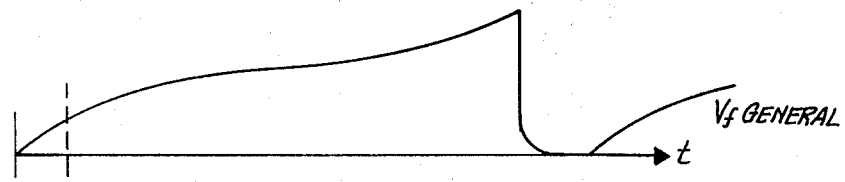
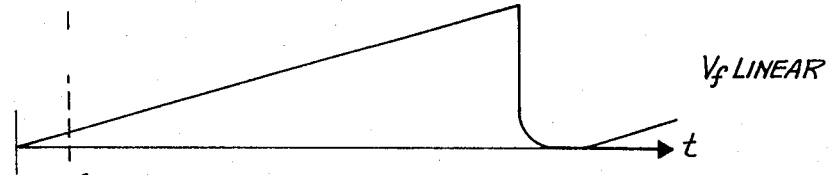
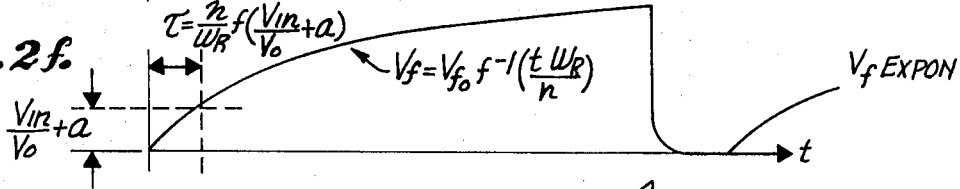
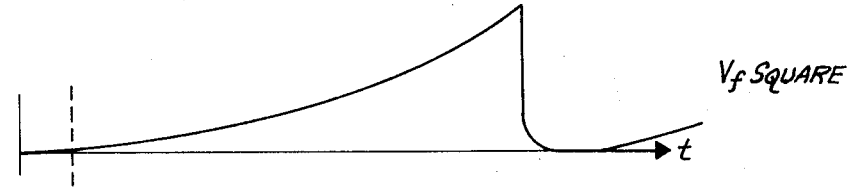
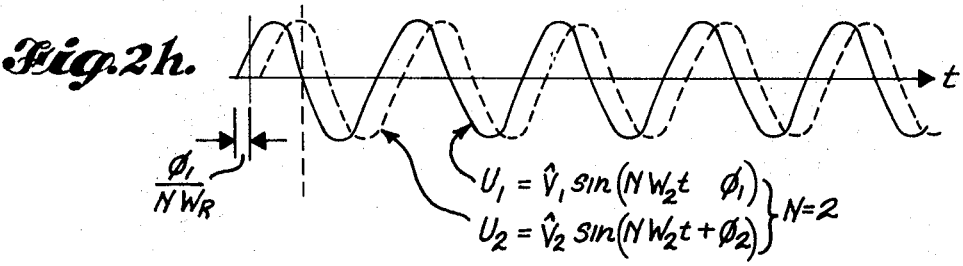

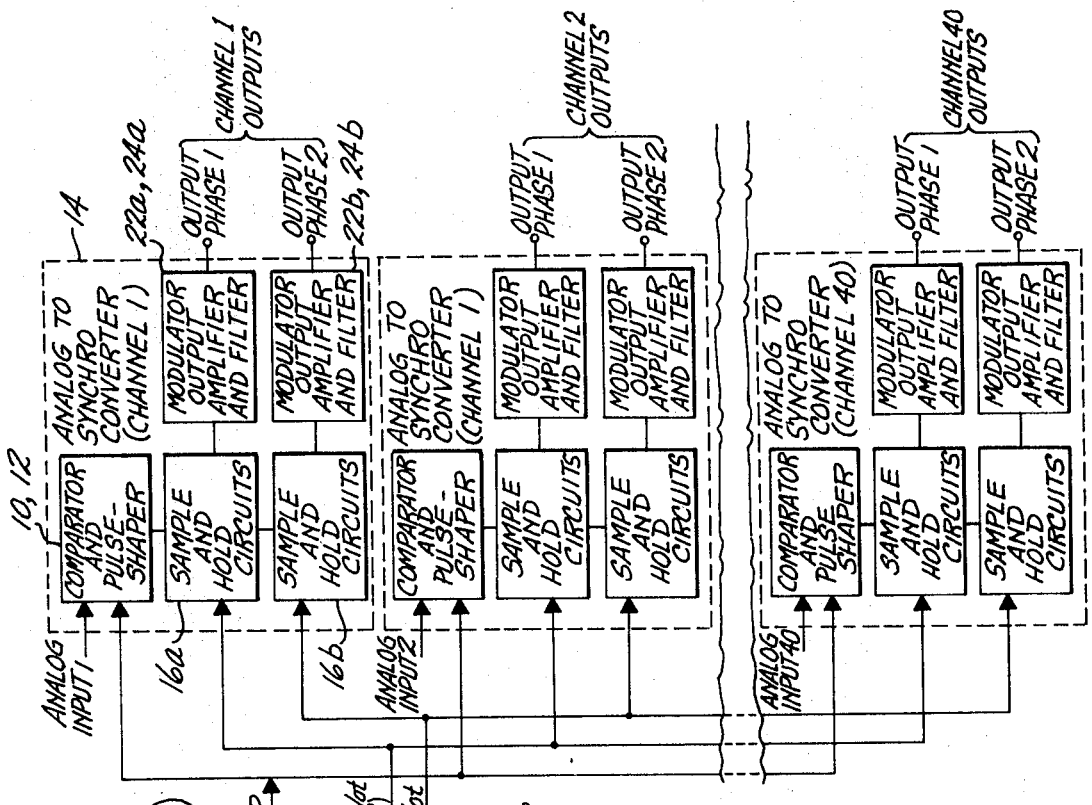
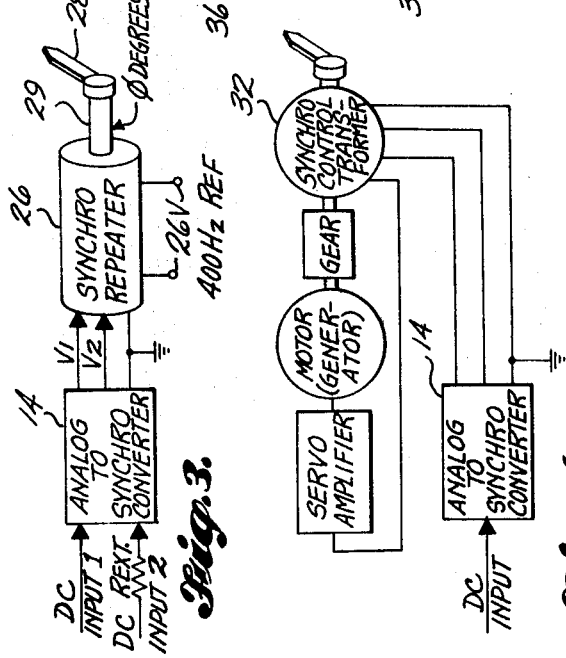

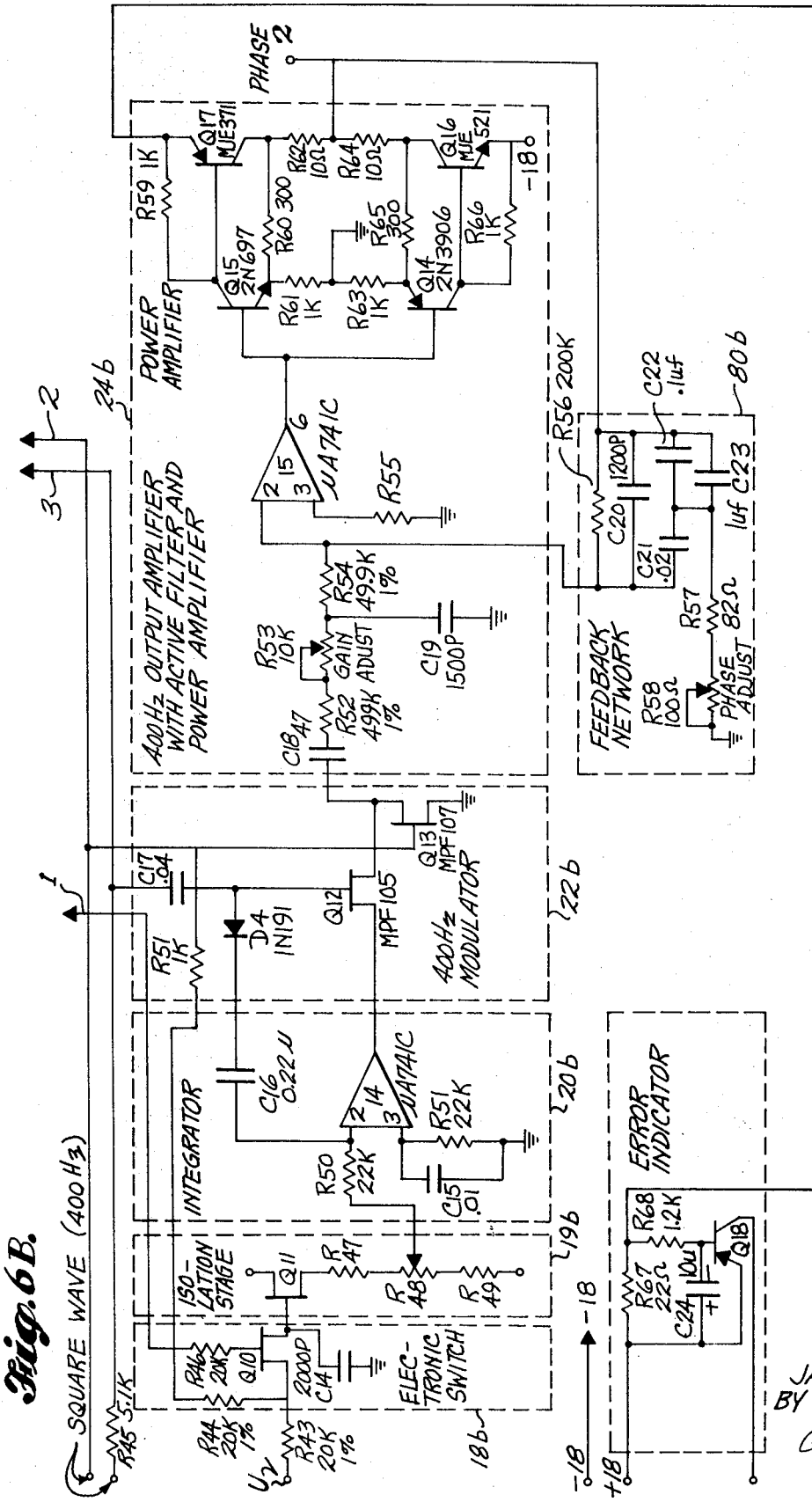

DATA CONVERSION SYSTEM

This invention relates to signal processing circuits and systems and, more particularly, to electronic analog signal converters.

Electromechanical systems have previously been used to convert a DC voltage into an AC synchro signal. Generally, a position servo receives the DC input signal and the output shaft of the servo is utilized to drive a synchro transmitter which performs the actual conversion from shaft position to synchro signal. Through simple in principle, there are several serious disadvantages of such prior art conversion systems. Electromechanical conversion devices require a substantial amount of space and are of limited accuracy. Also, electromechanical devices now used to convert a DC voltage to an AC signal are expensive due to the nature of such devices.

The present novel electronic converter in contrast requires little space, e.g. about 40 such converters occupy a 19-inch by 7-inch by 15-inch box, whereas one servo converter of the prior art occupies a volume of about 6 inches by 5 inches by 15 inches. Cost of the disclosed analog-synchro converter is very substantially less since limited to the cost only of the circuit components. A limiting factor in the accuracy of the prior art servo converter is the feedback potentiometer, the output of which is compared with the incoming DC voltage. The linearity error in the potentiometer may be in the order of 0.25 percent to 0.1 percent of full travel, thus the larger the travel, the larger will be the error measured in degrees. At 10 turns of travel, there would be an error of 3.6° even for a linearity error of 0.1 percent in the potentiometer. In the presently disclosed electronic converter, the errors are matched to be of the same order as a synchro or resolver, approximately 0.1°. The advantages of the electronic converter over the electromechanical converter of the prior art are thus made very apparent.

While in certain instrumentation/computer complexes the interface problem is solved by utilizing the DC voltages to directly drive D'Arsonval moving coil/permanent magnet instruments, but when it becomes necessary to drive instruments having high torque and requiring large travel, e.g., 270°, a synchro repeater or a servo-driven instrument has to be used. In such cases the present electronic analog-synchro converter converts the computer output voltages into 400 Hz. signals which can be utilized to directly drive synchro repeaters or are acceptable as input signals to such servo-driven instruments which have synchros or resolvers as feedback elements. Since the present electronic converter cost per channel plus a synchro repeater is approximately the same as the cost of a moving coil instrument with 270° movement, and since it is much easier to adapt pointers which may have to be lighted, to a synchro shaft than to a sensitive moving coil instrument, the present converter plus synchro combination is an attractive substitute for the present moving coil instrument.

It is accordingly an object of the present invention to provide improved analog- to synchro-type signal conversion.

It is a further object of this invention to provide a multichannel data conversion system providing two output voltages per channel and utilizing signal-generating means shared by a plurality of channels.

Other objects of this invention will become apparent from the following description when taken in conjunction with the accompanying drawings in which:

FIG. 1 is a diagrammatic drawing in block and schematic form illustrating an electronic analog-synchro converter system in accordance with one embodiment of the invention;

FIGS. 2a, 2b, 2c, 2d, 2e, 2f, 2g, and 2h are graphs showing certain waveforms useful in explaining the embodiment of FIG. 1;

FIG. 3 is a block diagram showing a system utilizing the electronic analog-synchro converter shown in FIG. 1 for direct drive of a pointer;

FIG. 4 is a block diagram of a system utilizing the electronic analog-synchro converter of FIG. 1 to feed a synchro control transformer;

FIG. 5 is a block illustrating a multichannel function generation system utilizing a plurality of electronic analog-synchro converters of the type shown in FIG. 1; and FIGS. 6a and 6b are detailed circuit diagrams of the electronic circuitry of the embodiment of FIG. 1.

Figure 1:
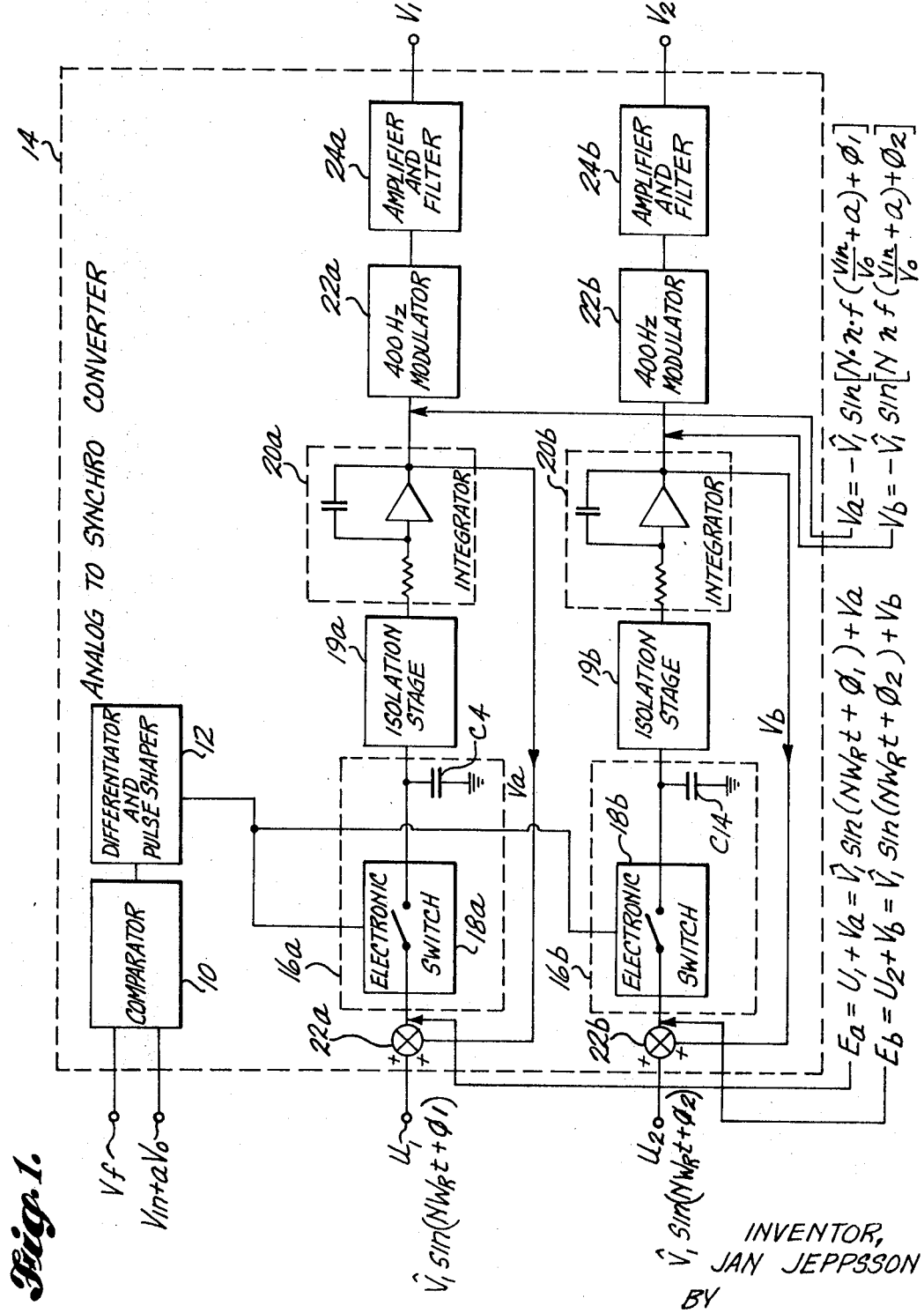

Referring to the drawings and more particularly to FIG. 1 thereof, there is illustrated in block and schematic form an electronic analog- to synchro-type signal converter system 14 incorporating the features of this invention. As shown in FIG. 1, the system 14 comprises a data conversion system having two output voltages $V_1$ and $V_2$. A multichannel data conversion system is shown in FIG. 5 which incorporates a plurality of channels of the type shown in FIG. 1. $V_{in}$ is shown in FIG. 1 as the input voltage to the channel, and $V_1$ and $V_2$ are shown as the output voltages of the single channel shown. The relationship between input and output can be written as:

$$V_1 = \sin\left\{f\left(\frac{V_{in}}{V_0} + a\right) + \phi_1\right\} \cdot V_p \sin W_R t$$

$$V_2 = \sin\left\{f\left(\frac{V_{in}}{V_0} + a\right) + \phi_2\right\} \cdot V_p \sin W_R t$$

where: $V_0$ = full input range of $V_{in}$    volts
$a$ = input bias constant    —
$\Phi 1.2$ = a constant angle    rad
$V_p$ = output peak value, typical volts
11. 2
$W_R$ = frequency of the reference power    rad/sec.
$f$ = a function, e.g. a linear or a logarithmic function Where a channel is to provide a signal to a synchro transformer or a synchro repeater, $\Phi_1$ shall be 0(0° and $\Phi_2$ shall be $\pi/6$ (60°) or, $\Phi_1 = 60°$ and $\Phi_2 = 120°$. In the case where a resolver signal is to be supplied, then $\Phi_1 = 0$ and $\Phi_2 = \pi/2$. The shaft position of the synchro then becomes $f(V_{in}/V_0+a)$ expressed in radians. Characteristic of the system is that the argument $f(V_{in}/V_0+a)$ is represented in the system as a time interval $\tau$ between reference pulses shown in FIG. 2a and sampling pulses shown in FIG. 2b. The reference pulse has a repetition frequency equal to the power reference frequency waveshape shown in FIG. 2c or the $n^{th}$ subharmonic of the power reference frequency. The sampling pulse is generated by comparing the input voltage plus bias signal with a cyclic signal $V_f$ (waveshape shown in FIG. 2d). At the instant the compared signals have the same value a step voltage occurs at the output of the comparator 10 shown in FIG. 1. This output of the comparator 10 is then coupled to the differentiator and pulse shaper 12 shown in FIG. 1 where it is differentiated and amplified. The signal $V_f$ has a fixed phase with respect to the reference pulse. The useful interval of $V_f$ is where its slope is greater than zero. The waveform of $V_f$ is determining the function $f$. Where the waveform of $V_f$ is a ramp signal as shown in FIG. 2e, the function $f$ will be linear. Where $V_f$ is an exponential waveform as shown in FIG. 2f, a logarithmic function results, and a time square waveform as shown in FIG. 2g will give a square root relationship between the time interval $\tau$ and the input voltage $V_{in}$. A linear $V_f$ is quite useful and it should be noted that while the total travel in $f(V_{in}/V_0+a)$ can theoretically be any, as a practical matter an upper limit of about 40 revolutions is set. The sine waves $U_1$ and $U_2$ shown in FIG. 2h have the phase angles $\Phi_1$ and $\Phi_2$ referred to the reference pulse as can be seen by comparison with FIG. 2a. The number of the harmonic N determines the total angular travel of the argument $f(V_{in}/V_0+a)$. The sine waves $U_1$ and $U_2$ applied as inputs to the system 14 as shown in FIG. 1 can in the case where they have a frequency of 400 Hz. be derived from a 400 Hz. power source, e.g., from a three-phase source or from a biphase oscillator synchronized to the reference. By proper mixing of in-phase and quadrature voltages from the oscillator, $\Phi_2$ can be made 60°. FIG. 1 shows the arrangement in system 14 of the sample and hold circuit 16a in the phase 1 portion of system 14. Sample and hold circuit 16a includes electronic switching means 18a and holding capacitor C4. The output voltage $V_a$ from integrator means 20a is fed back and added to the sinusoidal voltage $U_1$ adder means 22a in the phase 1 portion of system 14. Similarly, in the phase 2 portion of system 14, the output voltage $V_b$ obtained from integrator means 20b is fed back and added to the sinusoidal voltage $U_2$ by adder means 23b. At the time electronic switching means 18a in the phase 1 portion of system 14 closes, the error voltage $E_a = U_1 + V_a$ is sampled and held. $E_a$ equals zero in the steady state condition, and by substituting $\tau$ for $t$ in the equations for $E_a$ shown in the legends in FIG. 1, the solution becomes:

$$V_a = -V_1 \sin\left\{Nnf\left(\frac{V_{in}}{V_0} + a\right) + \phi_1\right\} \text{ and}$$

$$V_b = -V_1 \sin\left\{Nnf\left(\frac{V_{in}}{V_0} + a\right) + \phi_2\right\}$$

The voltages $V_a$ and $V_b$ developed in the phase 1 and phase 2 portions of system 14 are then modulated by modulator means 22a and 22b, respectively, filtered and amplified by amplifier and filter means 24a and 24b, respectively, to provide the phase 1 and phase 2 output voltages $V_1$ and $V_2$ at the desired level.

Turning now to FIG. 3 there is shown in block diagram form a system utilizing the electronic analog-synchro converter system 14 of FIG. 1. A synchro repeater 26 is shown directly driving an indicator means comprising a pointer 28 directly coupled to output shaft 29. This type of indicator means is possible only where there is very low additional mechanical load (friction) on the output shaft 29 because of the rather low torque per deviation ratio of synchro repeater 14.

Besides the use of analog-synchro converter system 14 to directly drive a synchro repeater 26 as shown in FIG. 3; by converting the output voltage or DC input from, e.g., a computer source into 400 Hz. signals $V_1$ and $V_2$, the converter output signals $V_1$ and $V_2$ are also acceptable and may be utilized as input signals to servo-driven instruments which have synchro control transformers or resolvers as feedback elements as shown in FIG. 4. In FIG. 4, the outputs from electronic analog-synchro converter system 14 feed synchro control transformer 32 which is utilized as a feedback element in the servo loop. The electronic analog-synchro converter system 14 permits the use of various types of known commercial instruments in a system of this type.

A multichannel data conversion system (40 channels) is shown in FIG. 5 utilizing a single-biphase oscillator 34 for generating $U_1$ and $U_2$ and a single function generator 36 which signals are shared by the converters of all channels. The system of FIG. 5 can therefore be seen to be especially advantageous if only a few types of functions have to be used in a plurality of channels, i.e., two linear functions with different ranges and a logarithm function. In the analog to synchro converter channel 1 of FIG. 5, the analog input voltage is compared in comparator and pulse shaper 10, 12 with a ramp voltage $V_f$ generated by ramp generator 36 (200 Hz.) which is synchronized to 400 Hz. power source 38. When analog input 1 balances out the ramp voltage, a sampling pulse is generated by comparator and pulse shaper 10, 12. Utilizing the sampling pulse, the instantaneous values of two 400 Hz. sine waves generated in biphase oscillator 34 are measured and held in sample and hold circuits 16a and 16b. The ramp voltage is phase locked to the two 400 Hz. signals. Subsequent to the sample and hold circuits 16a and 16b, further signal processing takes place respectively in the phase 1 and phase 2 portions of the converter 14 of channel 1 in modulator output amplifiers and active filters 22a, 24a and 22b, 24b which follow. The common utilization in a plurality of converter channels of the ramp voltage generator 36 and sine wave generator 34 reduces the size and cost of multichannel processing of data. If $V_f$ is an exponential waveform instead of the ramp voltage shown, the output shaft positions of the synchros coupled to the various channel outputs would be logarithm functions of the analog input voltages. This feature would be useful where a logarithmic scale is desired. By a combination of a ramp voltage generator 36 of a lower frequency, e.g., 80Hz. and sine waves from biphase generator 34 having a frequency of 2,400 Hz., it is possible to make the total range as high as 30 revolutions on the synchro shafts.

One converter channel 14 has been built in a small area of 5 inches by 4¼ inches on a printed circuit board, thus occupying a minimum of space and cost compared to the aforementioned prior art-type electromechanical converters. Furthermore, in contrast to the electromechanical conversion of signals, the following calculated and measured performance data of an electronic converter embodiment of the present invention will be appreciated by those skilled in the art:

Full input voltage range ±10 v. or ±100 v.
Zero drift referred to the input ±5 m.v. at 10 v.F.S.
Output voltages max volt. = 11.8 v., 400 Hz.
Nonlinearity, referred to an ideal synchro shaft position ±1 m. rad
Stability of the scaling from input voltage to shaft position 0.05 percent
Full output range referred to synchro shaft position ±1.5 rev. to 30 rev.

Figure 6A:
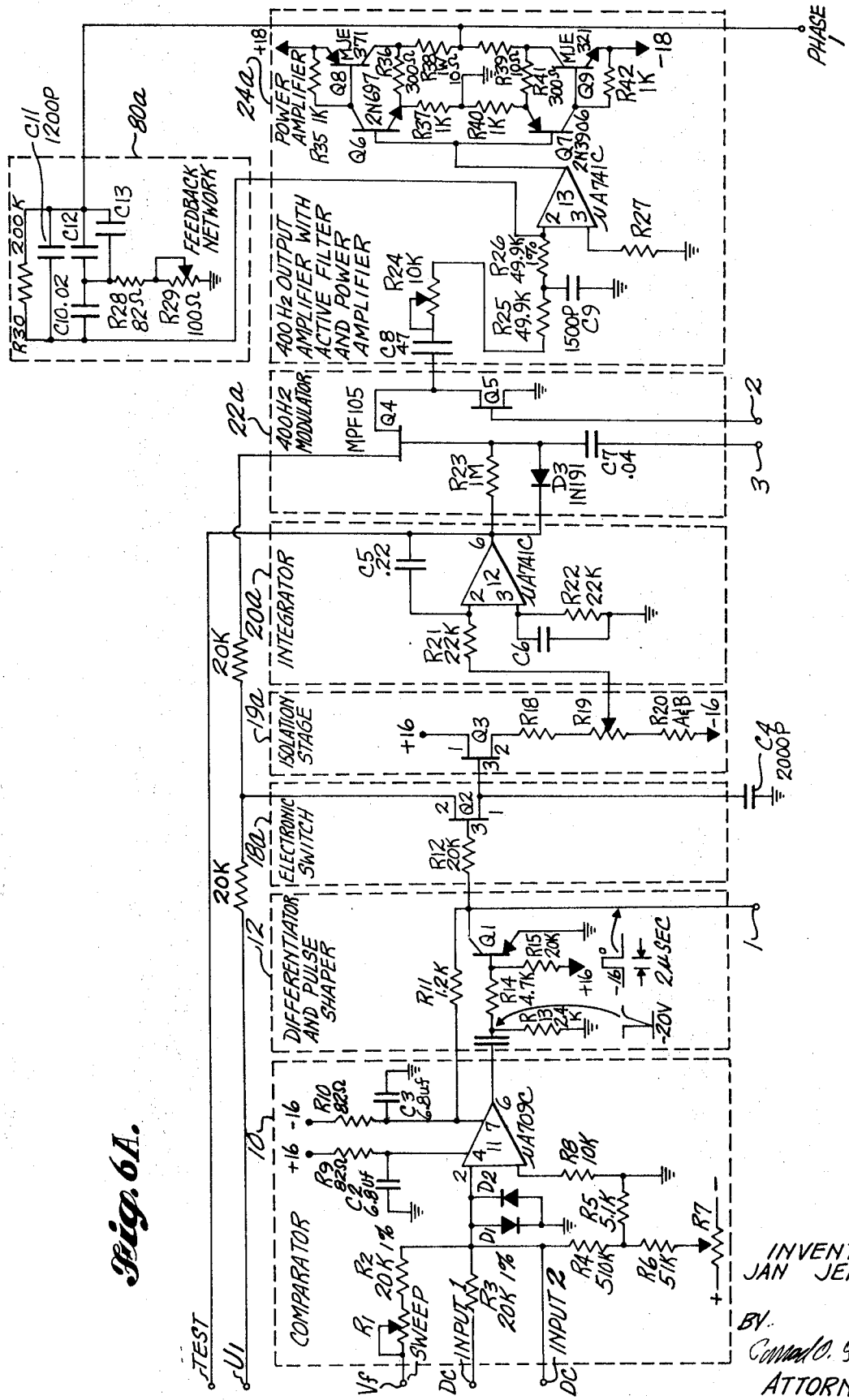

Referring now to FIGS. 6A and 6B with FIG. 6A arranged at the top of FIG. 6B, there is illustrated a detailed circuit diagram of the present electronic converter of FIG. 1 giving exemplary values for the circuit elements shown.

In the comparator means 10 of FIG. 6A, the sweep voltage $V_f$ and the input 1 voltage are added by means of resistors R2 and R3 and coupled to input terminal 2 of amplifier Il. An input 2 voltage may be applied to the terminal so captioned where a different scaling is desired or if an analog summing of two signals is needed and in such cases a resistor $R_{ext}$ is connected in series with input 2 terminal where $R_{ext}$ is selected in the kilohm range for desired scaling. When zero crossing occurs, the amplifier Il makes a step in the output voltage which appears at pin 6 of Il. The diodes D1 and D2 prevent large signals from saturating the amplifier. Resistor R1 in series with resistor R2 is needed to balance the amplifier so that with zero input on the input terminal of comparator 10 and with proper sweep input, the sampling pulse will occur when the $U_1$ signal crosses zero ($\Phi_1 = 0$). Variable resistor R1 provides a gain adjustment, and is used to set the scale factor on the input signal applied to the input terminal of comparator 10° to 20°/volt. Resistors R9 and R10 in series with Il and the 16 volt power source and shunt capacitors C2 and C3 to reference potential comprise the decoupling networks for preventing interaction between different converter channels when a plurality of channels 14 are used in a system, e.g., as shown in FIG. 5.

In the differentiator and pulse shaper means 12, the output step from amplifier Il is differentiated in the capacitance resistance network comprising capacitor C1 and resistor R14 series connected between output terminal 6 of amplifier Il and the input terminal comprising the base of transistor Q1, and resistor R13 connected between capacitor C1 and resistor R14 and reference potential as shown. The negative going pulse is the one which is utilized, and this negative going pulse is level shifted and shaped in the transistor Q1 as shown in the waveshapes on the leads of differentiator and pulse shaper 12 of FIG. 6A of the drawings. The resistor R15 coupled between the base of transistor Q1 and the positive 16 volt source provides a slight positive "off" biasing of transistor Q1 which results in fast fall and rise times of the shaped sampling pulse at the output collector electrode of transistor Q1. The following circuit description applies to both the phase 1 portion of the circuit of FIG. 6A and the phase 2 portion of the circuit of FIG. 6B having correspondingly similar circuitry although reference will be made to the phase 1 portion of FIG. 6A to avoid duplicate description of circuits. It should be noted in this connection that the sampling pulse from the collector of differentiator and pulse shaper 12 in the phase 1 (FIG. 6A)

portion of the system is transmitted by way of resistor R12 to gate electrode 3 of switching transistor Q2 while the sampling pulse is likewise transmitted via lead 1 in the phase 2 (FIG. 6B) portion of the system through corresponding resistor R46 to the gate electrode of switching transistor Q10. Electronic switching means 18a utilizes an N-channel field effect transistor Q2 of type 2N4220. One side of the switch Q2 is connected to the junction of resistors R16 and R17, the other end of resistor R16 being coupled to a sine wave $U_1$, while the other end of resistor R17 is coupled to the output terminal 6 of operational amplifier I2 of integrator 20a. The junction of resistor R16 and R17 which is coupled to one side of switch Q2 is the point at which the error voltage in the sampling loop is generated. This voltage is normally zero or very close to zero. When the sampling pulse goes from −v. to zero on the collector of transistor Q1, switch comprising transistor Q2 will close thereby conducting between terminals 1 and 2 thereof, and the error voltage will charge the holding capacitor C4 which is coupled between the other side of switching transistor Q2 at terminal 1 thereof and reference potential. It should be noted that switching transistor Q10 performs a corresponding function in the FIG. 6B phase 2 portion of the converter 14, viz, a sine wave $U_2$ but of different phase is coupled to one side of switching transistor Q10 by way of resistor R43.

Proceeding now in the FIG. 6A phase 1 portion of the converter 14 to the isolation stage 19A which includes transistor Q3, it should be noted that transistor Q3 works in a source follower connection. The gate source voltage thereof is compensated by the voltage drop across resistor R18 and part of variable resistor R19. Gate electrode 3 of transistor Q3 in isolation stage 19a is connected to holding capacitor C4 and electrode 1 of switching transistor Q2. Transistor Q3 and resistors R18, R19, and R20 are matched for providing low temperature drift. Integrator means 20a comprises operational amplifier I2 which may be a Fairchild type $\mu$A471c or equivalent. The first input terminal 2 of operational amplifier I2 is coupled to transistor Q3 by means of the variable tap on various resistor R19 via resistor R21. Input terminal 2 is coupled by means of capacitor C5 to the output terminal 6 of operational amplifier I2. The other input terminal 3 of operational amplifier I2 in the integrator means 20a is coupled through the parallel R–C network comprising resistor R22 and capacitor C6 to reference potential. The integrator output balances out the first sinusoidal signal $U_1$ at the time of the generated sampling pulse.

The output from integrator 20a is modulated by a 400 Hz. square wave signal in a series—shunt-type FET chopper circuit in 400 Hz. modulator means 22a. The gate electrode of transistor Q4 is coupled by means of the parallel resistor diode combination of D3 and R23 to output electrode 6 of operational amplifier I2 with the diode D3 preventing the gate from going positive with respect to the source which is tied to the output terminal 6 of operational amplifier I2. The 400 Hz. square wave power frequency generator is coupled by lead 3 through capacitor C7 to the gate of transistor Q4. Transistor Q4 is off when transistor Q5 is on and vice versa, which control is effected by the aforementioned square wave reference generator which is utilized in common by transistors Q4 and Q5, the gate of transistor Q5 being connected by lead 2 to the 400 Hz. square wave generator. The power frequency generator connected to leads 2 and 3 provides a first signal at lead 2 which is going between −16 volts and 0 volts, and a second signal at lead 3 which is going between +7.5 volts and −7.5 volts and having the opposite phase as the first signal. The gate voltage of transistor Q4 follows the output voltage from operational amplifier I2 during the positive half-period of the second signal which causes transistor Q4 to conduct during this time interval.

Turning now to FIG. 6B and a description of the phase 2 400 Hz. output amplifier which follows, it will be recognized that the square wave voltage from the preceding 400 Hz. modulator 22b contains a DC component as well as the familiar 3rd, 5th, and 7th, etc., harmonics of 400 Hz. all of which have to be filtered out before they become applied to the synchro windings. The fundamental signal is required to be accurately amplified and is furthermore required to have a predetermined phase shift with respect to the 26 v. reference. The output stage must for short moments (less that 1 second) be able to deliver 11.8 volts r.m.s. into a 10-ohm inductive load.

The accurate gain, phase shift control and filtering is solved in one basic circuit comprising operational amplifier I5 with the feedback network 80b and the input network. The transfer function of the complete circuit is:

$$\frac{V_{phase}}{V_{in}} = \underbrace{\frac{\frac{s}{250}}{1+\frac{s}{250}}}_{\text{High Pass Filter}} \cdot \underbrace{\frac{A}{1+\frac{2\zeta s}{W_0}+\left(\frac{s}{W_0}\right)^2}}_{\text{Low Pass Filter}}$$

$W_0$ is adjusted with the phase control potentiometer R58 to approximately 400 Hz., $\zeta$ is the damping factor, and is chosen to be 0.25. The filter attenuates the third harmonic down to 2 percent, and the fifth harmonic down to 0.4 percent. The total gains equals $A/2\zeta$ and is adjusted with potentiometer R53. The 400 Hz. output amplifier comprises coupling capacitor C18 coupled at one end to receive the 400 Hz. modulator output from the connected output electrodes of transistors Q12 and Q13, the other end of coupling capacitor C18 being connected to resistor R52 at one end of the series combination of resistor R52, gain adjustment variable resistor R53 and resistor R54, with the other end of the series combination including a direct connection from the resistor R54 to the input 2 of operational amplifier I5 and feedback network 80b, feedback network 80b which includes phase adjustment means comprising variable resistor R58 being coupled between input terminal 2 of operational amplifier I5 and the phase 2 output terminal of the power amplifier. The power amplifier has a voltage gain of only 1.3 times; however, the power output is the important factor. The power amplifier comprises input transistors Q14 and Q15 having the bases thereof directly connected to output terminal 6 of operational amplifier I5. Output transistors Q16 and Q17 are connected as "grounded emitter" stages with feedback provided as shown to the emitters of the input transistors in the manner understood by those skilled in the art.

An error circuit indicator means 82 is provided for the present electronic analog-synchro converter system to indicate malfunction of the system or of the synchro connected to to it. This is accomplished by monitoring the +18 v. supply current which increases if failures occur. When the voltage drops across the resistor R67 and the threshold level of 0.6 v. is reached, transistor Q18 starts to conduct and a signal lamp coupled between the collector of transistor Q18 and ground will light up. This error indicator circuit is of special importance when a synchro receiver is connected to the output of the converter. The indicator not only gives visible error signal indication for misalignment and component failures but also indicates for failures such as faulty connections to the synchro and undesirably high-friction level, sticking needles, etc.

Since numerous changes may be made in the above system and circuits and different embodiments may be made without departing from the spirit and scope thereof, it is intended that all matter contained in the foregoing description or shown in the accompanying drawings shall be interpreted as illustrative and not in a limiting sense.

I claim:

1. An analog to synchro signal converter comprising:
   means for comparing said analog signal and a reference signal to generate a sampling pulse;
   a first sample-hold circuit responsive to said sampling pulse for sampling a first sine wave of a predetermined frequency and holding said sampled signal in the interval between samplings to produce a first sample-hold output signal;

a second sample-hold circuit responsive to said sampling pulse for sampling a second sine wave of said predetermined frequency and out of phase with said first sine wave and holding said sampled signal in the interval between samplings;

first modular circuit means;

first integrator circuit means for receiving the sample-hold output signal from said first sample-hold circuit, said first integrator circuit means interposed between said first sample-hold circuit and said first modulator circuit means;

a first feedback path coupled between the output of said first integrator circuit and the input of said first sample-hold circuit;

second modulator circuit means;

second integrator circuit means for receiving the sample-hold output signal from said second sample-hold circuit, said second integrator circuit means interposed between said second sample-hold circuit and said second modulator circuit means;

a second feedback path coupled between the output of said second integrator circuit and the input of said second sample-hold circuit;

first amplifier and filter means coupled to the output of said first integrator circuit and providing a first converter output signal; and second amplifier and filter means coupled to the output of said second integrator circuit and providing a second converter output signal.

2. The converter according to claim 1 wherein said means for comparing said analog signal and a reference signal to generate a sampling pulse comprises comparator means for providing a step voltage when said compared signals are of the same value.

3. The converter according to claim 2 further comprising differentiator and pulse shaper means coupled to said comparator means for providing said sampling pulse.

4. The converter according to claim 1 wherein said reference signal comprises an exponential waveform.

5. The converter according to claim 1 wherein said reference signal comprises a linear waveform.

6. The converter according to claim 1 wherein said reference signal has a repetition frequency equal to said predetermined frequency or a subharmonic of said predetermined frequency.

7. A system for converting a plurality of analog-type signals into a plurality of pairs of synchro-type signals comprising in combination:

means for generating a reference signal;

means for generating a first sine wave voltage of a predetermined frequency and phase and a second sine wave voltage of said predetermined frequency and out of phase with said first sine wave voltage;

first comparator and pulse shaper means for comparing a first of said plurality of analog-type signals with said reference signal to generate a first sampling pulse;

first sample and hold circuit means responsive to said first sampling pulse and said first sine wave voltage;

second sample and hold circuit means responsive to said first sampling pulse and said second sine wave voltage;

first modulator, amplifier, and filter means coupled to said first sample and hold circuit means to provide one of a first pair of said plurality of pairs of synchro-type signals;

second modulator, amplifier, and filter means coupled to said second sample and hold circuit means to provide the other of said first pair of synchro-type signals;

a second comparator and pulse shaper means for comparing a second of said plurality of analog-type signals with said reference signal to generate a second sampling pulse;

third sample and hold circuit means responsive to said second sampling pulse and said first sine wave voltage;

fourth sample and hold circuit means responsive to said second sampling pulse and said second sine wave voltage;

third modulator, amplifier, and filter means coupled to said third sample and hold circuit means to provide one of a second pair of said plurality of pairs of synchro-type signals; and fourth modulator, amplifier, and filter means coupled to said fourth sample and hold circuit means to provide the other of said second pair of said plurality of pairs of synchro-type signals.

8. The system according to claim 7 wherein said means for generating said first and second sine wave voltages comprises biphase oscillator means.

9. The system according to claim 7 wherein said reference signal has a repetition frequency equal to said predetermined frequency of a subharmonic of said predetermined frequency.